COUPLED MAGNETIC FILM MEMORIES
Filed July 14, 1967 3 Sheets-Sheet 1
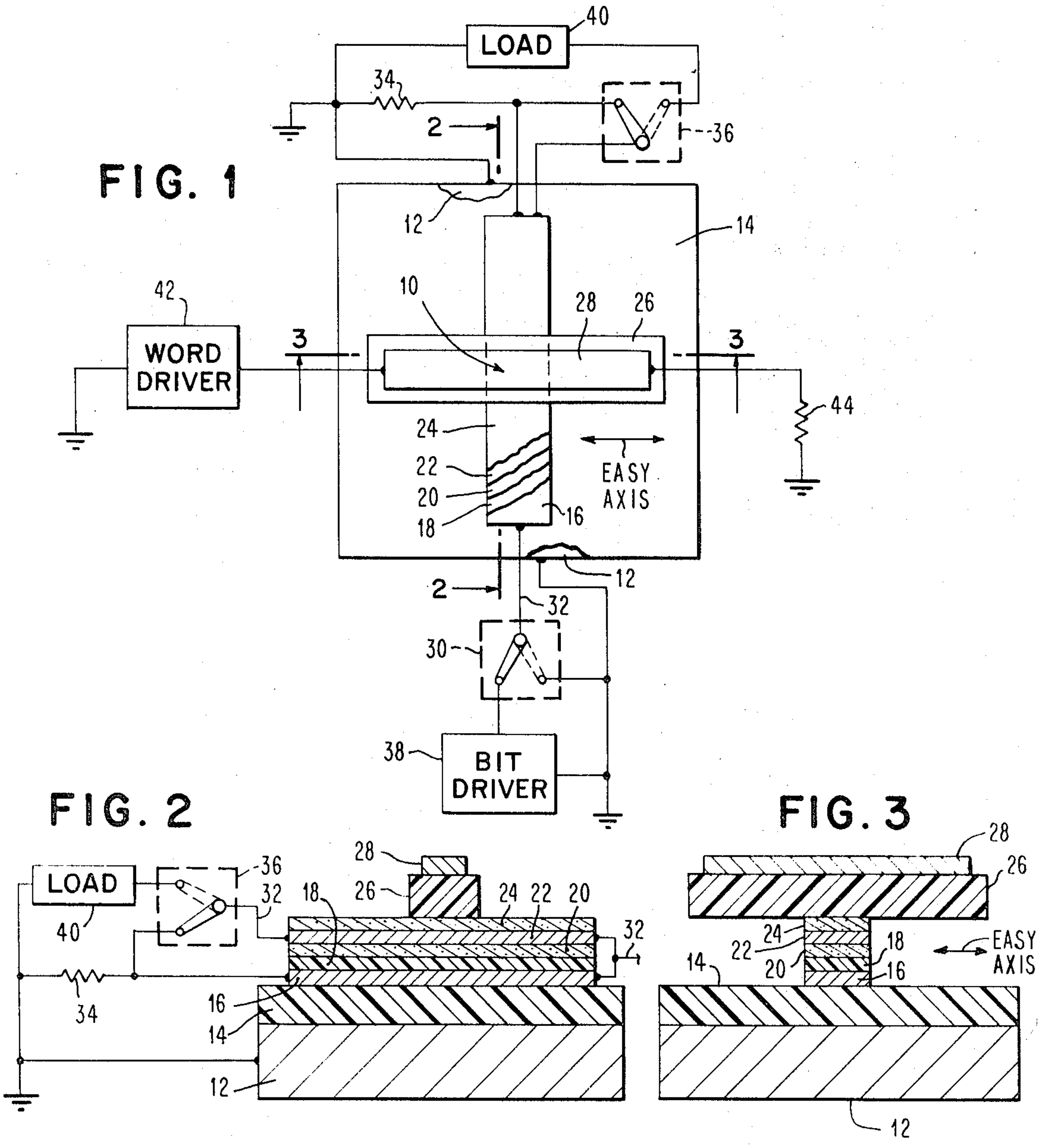
FIG. 1, FIG. 2, FIG. 3
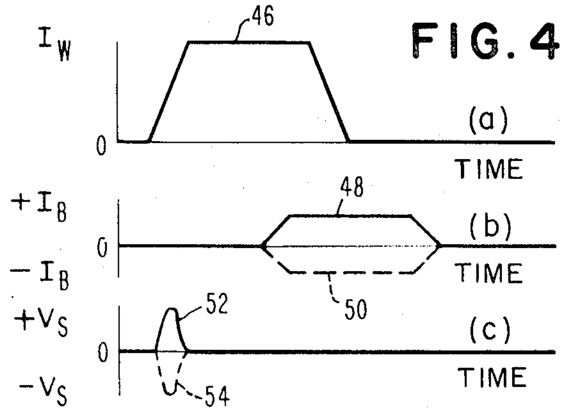
INVENTOR
GEORGE E. KEEFE
BY Stephen J. Limanek
ATTORNEY Dec. 29, 1970 G. E. KEEFE 3,551,901

COUPLED MAGNETIC FILM MEMORIES

Filed July 14, 1967 3 Sheets-Sheet 3

United States Patent Office 3,551,901

Patented Dec. 29, 1970

3,551,901

COUPLED MAGNETIC FILM MEMORIES

George E. Keefe, Montrose, N.Y., assignor to International Business Machines Corporation, Armonk, N.Y., a corporation of New York Filed July 14, 1967, Ser. No. 653,392
Int. Cl. C11c 5/02, 11/14
U.S. Cl. 340—174 9 Claims

ABSTRACT OF THE DISCLOSURE

A storage system having a pair of magnetic films disposed on one side of an electrically conductive substrate. A first electrically conductive line is disposed between the films and the substrate and a second electrically conductive line is disposed parallel to the first line and between the films. The first and second conductive lines are spaced so that the magnetic field intensity in each of the films is substantially equal when current is passing through these lines in the same direction. Means are also provided for establishing a magnetic field in the films perpendicular to the magnetic field produced by the current in the conductive lines.

BACKGROUND OF THE INVENTION

Field of the invention

This invention relates to coupled magnetic film storage systems and more particularly to coupled magnetic film storage systems having films disposed on only one side of a substrate in magnetic fields of substantially equal intensity.

Description of the prior art

In a copending commonly assigned U.S. patent application having Ser. No. 364,982 filed on May 5, 1964 by O. Voegeli, there is described a storage system which utilizes an electrically conductive substrate supporting on one side thereof coupled films formed by first and second parallel magnetic strips between which a conductive line is disposed. When current flows through the line, which is connected to the substrate, a magnetic field having a given direction is set up in the magnetic strips or films. Since the current used in storage systems is generally in pulse form, an image current is momentarily established in the substrate which together with the current in the conductive line produces a magnetic field in the first film strip, i.e., the film located between the conductive line and the substrate, which is substantially higher, e.g., three times, than the magnetic field intensity in the second film strip disposed on the opposite side of the conductive line. In order to produce a magnetic field in the second film which is sufficiently strong to control the magnetization of the second film, the magnetic field in the first film is greater than desired since this relatively strong field tends to disturb information stored at other locations which may also be controlled by a current passing through the same conductive line. Although the Voegeli storage system operates satisfactorily it has found desirable to provide a system in which the first film strip has disturb margins as wide as disturb margins of the second film strip.

In a coupled film storage system described in copending commonly assigned U.S. patent application having Ser. No. 421,233 filed on Dec. 28, 1964 also by O. Voegeli, now Pat. No. 3,452,334, issued June 24, 1969, each of a pair of magnetic films are disposed in magnetic fields of equal intensity but these films are located on opposite sides of a conductive substrate which precludes readily forming coupled films having a closed magnetic path and close spacing between the pair of films.

SUMMARY OF THE INVENTION

In accordance with the present invention a storage system is provided which utilizes coupled films having first and second magnetic strips or layers each located in magnetic fields of substantially the same intensity on the same side of an electrically conductive substrate or ground plane. The magnetic fields of equal intensity may be produced in the first and second magnetic strips by providing a first current carrying line between the first and second magnetic strips and a second current carrying line between the strips and the substrate, with current flowing in the same direction in the two lines. In order to provide fast rotational switching of the magnetization of the films, a further magnetic field is established which is perpendicular to the field produced by the current in the first and second lines.

It is an object of this invention to provide an improved coupled magnetic film storage system which has wider disturb margins.

It is another object of this invention to provide an improved coupled magnetic film storage system having its magnetic strips in magnetic fields of substantially equal intensity in which eddy currents are minimized.

Yet another object of this invention is to provide an improved coupled magnetic film storage system having its magnetic strips in substantially equal intensity magnetic fields which is more easily fabricated.

The foregoing and other objects, features and advantages of the invention will be apparent from the following more particular description of preferred embodiments of the invention, as illustrated in the accompany- drawings.

BRIEF DESCRIPTION OF THE DRAWINGS

In the drawings:

FIG. 1 illustrates an embodiment of the magnetic film storage system of the present invention showing only one storage element, FIG. 2 is a cross-sectional view of the storage element of the system illustrated in FIG. 1 taken through line 2—2 of FIG. 1, FIG. 3 is a cross-sectional view of the storage element illustrated in FIG. 1 taken through line 3—3 of FIG. 1, FIG. 4 illustrates a pulse program for the system shown in FIGS. 1, 2 and 3.

DESCRIPTION OF THE PREFERRED EMBODIMENTS

Figure 5:
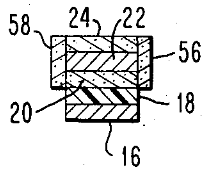
FIG. 5 is a cross-sectional view of a modification of the storage element illustrated in FIG. 1, which view corresponds to a portion of the view shown in FIG. 3.

Referring to the drawings in more detail, there is shown in FIGS. 1, 2 and 3 an embodiment of the magnetic film storage system of the present invention which for purposes of illustration only is limited to a single magnetic coupled film 10. The coupled film 10 is formed on a substrate 12 which is preferably an electrically conductive ground plane on which is deposited a first layer of insulating material 14, for example, silicon monoxide. A first flat, electrically conductive line or strip 16, which may be made of copper is deposited in any conventional manner on the insulating layer 14. A second insulating layer 18 may be placed on the conductive line 16. Deposited on the second insulating layer 18, e.g., through a suitable given mask (not shown) in the presence of a given magnetic orienting field is a first strip of magnetic material 20, such as permalloy having a thickness of about 2,000 angstroms, forming the bottom layer of the coupled film 10. The given magnetic orienting field is directed substantially transversely of the length of the magnetic strip 20 to establish a magnetic easy axis is the strip 20 in the direction of the magnetic field, as indicated in FIG. 1. A second flat strip or line of electrically conductive material 22 is deposited on the magnetic strip 20. A second strip of magnetic material 24, for example, similar to the first magnetic strip 20, deposited on the second conductive line 22, e.g., through the given mask in the presence of the given magnetic orienting field, forms the upper layer of the coupled film 10. Disposed over the second strip of magnetic material 24 in a direction orthogonal to that of the first and second magnetic strips 20 and 24 is a third layer of insulating material 26 which may be made of, for example, Mylar. A third electrically conductive strip 28 is disposed on the third layer of insulation 26 also orthogonally arranged with respect to the first and second magnetic strips 20 and 24. The third conductive strip 28 may be used as a word line for the storage or memory system.

The first conductive strip 16 is connected at one end to a first switching means 30 through a conductor 32 and at the other end to ground through a line terminating impedance 34, as shown more clearly in FIG. 2. The second conductive strip 22 is also connected at one end to the first switching means 30 through the conductor 32 and at the other end is connected to a second switching means 36. The first switching means 30 is operative to connect the one end of the first and second conductive strips 16 and 22 either to a bit line driver or generator 38 or to ground or the conductive substrate 12, while the second switching means 36 is operative to connect the other end of the second conductive strip 22 either to ground through the line terminating impedance 34 or to a load 40, which may be a conventional sense amplifier. One end of the third conductive strip or word line 28 is connected to a word line driver 42 and the other end of the word line 28 is connected through a word line terminating impedance 44, which is preferably the characteristic impedance of the word line 28, to ground. The first and second switching means 30 and 36 are preferably ganged so that when one end of the first and second conductive strips 16 and 22 are connected to the bit line driver 38 by the first switching means 30, the other end of the second conductive strip 22 is connected to ground through the impedance 34 by the second switching means 36, and when the other end of the second conductive strip 22 is connected by the second switching means 36 to the load 40, the one end of the second conductive strip 22 is connected by the first switching means 30 to ground. By providing the first and second switching means 30 and 36 in the system of the present invention, the second conductive strip 22 may be used as a sense line as well as an element of the bit drive line of the present invention, as will be explained in more detail hereinafter. If the switching means 30 and 36 are not used, an additional line similar to the second conductive line 22 may be provided as a sense line between magnetic strips 20 and 24. When the substrate 12 is a ground plane, as illustrated in FIG. 1, it is used as the return path for both the bit and word lines.

FIG. 4 of the drawing shows a pulse program which may be used in connection with the operation of the system shown in FIGS. 1, 2 and 3 of the drawing.

In the operation of the embodiment illustrated in FIGS. 1, 2 and 3 of the drawing, to store information in the magnetic coupled film 10, a positive pulse of current 46 indicated in FIG. 4 at (*a*) is passed through the word line 28 from the word line driver 42, FIG. 1, to provide a magnetic field in the coupled film 10 which is perpendicular to the easy axis of the film 10, that is, in the direction of the hard axis of the coupled film 10, and a positive or negative pulse 48 or 50 of current, indicated in FIG. 3 at (*b*), is passed through the first and second conductive strips 16 and 22 from the bit line driver 38 to provide a magnetic field in the coupled film 10 along the easy axis thereof. It can be seen that the current pulse 46 in the word line 28 produces a magnetic field in the bottom and top magnetic layers 20 and 24 of the coupled film 10 which orients the magnetization in the coupled film 10 in a direction perpendicular to the easy axis of the film 10, that is, in the hard axis.

Accordingly, when only a magnetic field produced by the word current pulse 46 is applied to the coupled film 10, the magnetization of the film 10 is indicative of neither a "0" nor a "1" bit of information. However, when current is passed concurrently through the word line 28 and the first and second conductive strips 16 and 20, the magnetization of the coupled film 10 is disposed in a direction located at an angle to the hard direction at one side or the other in each layer 16 and 22 thereof depending upon whether a positive pulse 48 or a negative pulse 50 is passing through the first and second conductive strips 16 and 22. To write a "1" into the coupled film 10, a positive current pulse 46 or $I_W$ from the word line driver 42 is applied to the word line 28 and concurrently therewith the positive current pulse 48 or $+I_B$ from bit line driver 38 is applied to the first and second conductive strips 16 and 22. The positive word current pulse 46 is terminated prior to the termination of the positive bit current pulse 48. When only a field produced by the positive word current pulse 46 is applied to the coupled film 10, the magnetization in both the top and bottom layers 20 and 24, respectively, of the coupled film 10 may be considered to be in an upwardly vertical direction, as viewed in the plane of the drawing. When a magnetic field is thereafter concurrently produced by the positive bit current pulse 48, the magnetization is rotated in a clockwise direction in the top magnetic layer 24 and counterclockwise in the bottom magnetic layer 20 of the coupled film 10, toward the horizontal direction, that is, toward the easy axis of the coupled film 10. When the positive word current pulse 46 is terminated, the magnetization in the upper layer 24 is established horizontally to the right, as indicated in FIG. 3 of the drawing, and in the bottom layer 20 horizontally to the left, i.e., anti-parallel with respect to the magnetization in the upper layer 24. To store a "0" bit of information in the system illustrated in FIGS. 1, 2 and 3 of the drawing, the operation is similar to that described hereinabove in connection with the storage of a "1" bit of information except that a negative bit current pulse 50 or $-I_B$ from bit driver 38 is passed through the first and second conductive strips 16 and 22 to produce a magnetic field in the coupled film 10 which rotates the magnetization in the top magnetic layer 24 in a counter-clockwise direction while rotating the magnetization of the bottom magnetic layer 20 in a clockwise direction toward the easy axis of the coupled film 10. When the coupled film 10 is storing a "0" bit of information, the direction of the magnetization of the top and bottom layers are opposite to that when a "1" bit of information is stored.

Reading the information stored in the coupled film 10 is accomplished by connecting the load 40 to the second conductive strip 22 and passing a word current 46 or $I_W$ indicated in FIG. 4 at (*a*), through the word line 28. The output pulses indicated in FIG. 4 at (*c*), which are produced in the second conductive line 22 and applied to the load 40, are bipolar, a positive voltage 52 or $+V_s$ representing a "1" bit of information and a negative voltage 54 or $-V_s$ representing a "0" bit of information.

In the system illustrated in FIGS. 1, 2 and 3 of the drawing, output voltages in the second conductive line 22 applied to the load 40 have a magnitude of about 10 millivolts when word currents $I_W$ of 0.5 ampere are supplied to the word line 28, bit currents $I_B$ of 0.030 ampere are supplied to the first and second conductive lines 16 and 22 during the writing operation and when each of the magnetic layers 20 and 24 of the coupled film 10 is 0.020 inch x 0.040 inch x 2,000 angstroms having an anisotropy field $H_k$ of about 4 oersteds and a coercive force of about 3 oersteds.

The first conductive line 16, which is made of material having a resistivity approximately ten times less than that of the magnetic material of the first and second magnetic strips 20 and 24 need not be completely insulated from the magnetic strip 20 but it is preferable to utilize the insulating layer 18 between the first and second conductive strips 16 and 22 to provide a stronger output signal at the load 40 during the reading operation.

A thickness of 2,000 angstroms has been suggested hereinabove for the top and bottom magnetic layers 20 and 24 of the coupled film 10, however, thicknesses between 10,000 and 20,000 angstroms may be used if desired, the thickness being limited only by fabrication and eddy current considerations.

Since both of the magnetic strips 20 and 24 of the coupled film 10 are located on the same side of the conductive substrate 12 an edge closure between the two magnetic strips 20 and 24 with suitable magnetic material may be readily provided. This suitable magnetic material may take the form of addition strips 56 and 58 shown in FIG. 5 of the drawing which is similar to a portion of the cross-sectional view illustrated in FIG. 3. These additional strips 56 and 58 may be applied to the edges of the magnetic strips 20 and 24 by employing any known technique such as electroplating or electroless-plating. An advantage of the coupled fim embodiment illustrated in FIG. 5 is that a completely closed magnetic flux path is provided which minimizes demagnetization and creeping in the coupled film and, thus, provides a more stable memory element.

The operation of the system of the present invention when utilizing the modified coupled film illustrated in FIG. 5 of the drawing is similar to that described hereinabove in connection with the embodiment illustrated in FIGS. 1, 2 and 3.

Figure 6:
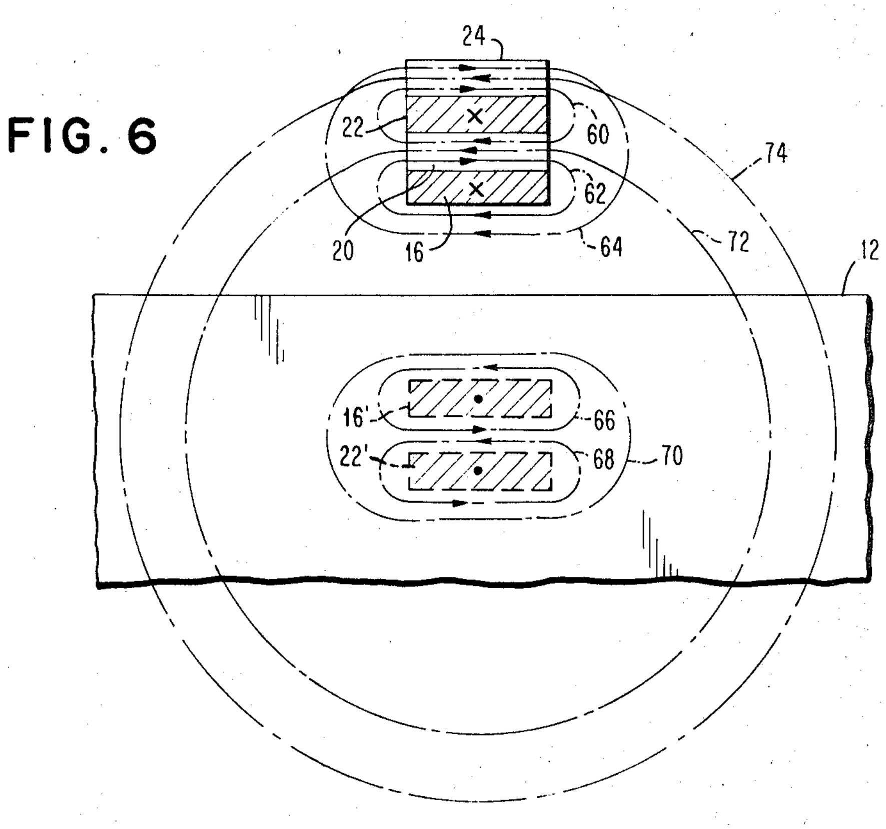
FIG. 6 shows magnetic fields passing through the magnetic films of the storage system illustrated in FIGS. 1–3, FIG. 7 indicates the directions of the residual flux in the magnetic films resulting from the magnetic fields illustrated in FIG. 6.

In order to more clearly understand how the magnetic fields of equal intensity are produced in each of the magnetic strips 20 and 24 of the coupled film 10 in accordance with the teachings of the present invention, reference may be had to FIG. 6 of the drawing which shows an enlarged view of the storage system similar to the cross-sectional view of FIG. 3 but with only certain conductive and magnetic elements illustrated for purposes of clarity.

In FIG. 6 of the drawing, current is indicated as flowing into the plane of the drawing through each of the first and second conductive lines 16 and 22. Thus, the current in the second conductive line 22 produces about line 22 a magnetic field 60 which has a clockwise direction as indicated and the current in the first conductive line 16 produces about line 16 a magnetic field 62 which also has a clockwise direction as indicated. Since the two fields 60 and 62 are opposed to each other in the space between the two lines 16 and 22 which is occupied by the first magnetic strip 20, there is a substantially zero magnetic field in the first magnetic strip 20 produced by the current flowing through lines 16 and 22. Although a field is not produced in the first magnetic strip 20, there is a magnetic field 64 of relatively high intensity produced about the two conductive lines 16 and 22, the line 16 and 22, e.g., being considered as a single line, which passes through the second magnetic strip 24.

Since the storage system of the present invention is operated by applying current pulses to the conductive lines 16 and 22, as indicated in FIG. 4 of the drawing at (*b*), an image current is produced in portions of the conductive substrate or ground plane 12 indicated at 16′ and 22′. These portions 16′ and 22′ may be considered mirror images of the conductive lines 16 and 22 about the upper surface of the substrate 12, as is well known in the art. The current in portions 16′ and 22′ being a return current, as indicated in FIG. 6, of the current in conductive lines 16 and 22, the magnetic fields produced thereby have a counterclockwise direction rather than a clockwise direction but with a distribution otherwise similar to that described in connection with the currents in lines 16 and 22. A magnetic field 66 tends to surround the portion 16′ and a magnetic field 68 tends to surround the portion 22′ with a magnetic field 70 surrounding both of the portions 16′ and 22′ in the manner that field 64 surrounds both conductive lines 16 and 22. Since a magnetic strip of the coupled film is not located in the magnetic field indicated by line 70, this field is of little importance except that it is part of a magnetic field pattern which also includes magnetic field lines such as line 72 which passes through the first magnetic strip 20 and line 74 which passes through the second magnetic strip 24 of the coupled film 10 in a counterclockwise direction.

Figure 7:
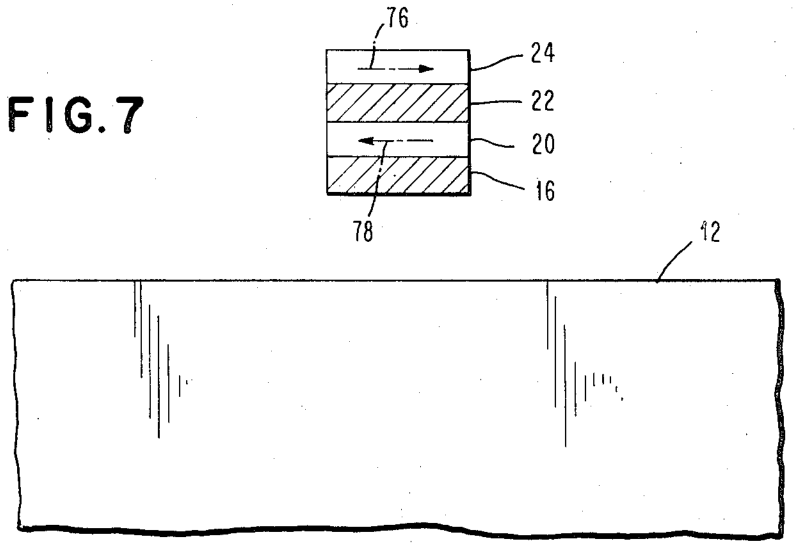

It can be seen that the relatively strong magnetic field 64 passing through the second magnetic strip 24 in a direction from left to right is opposed somewhat by the weaker field 74 passing through the second strip 24 from right to left to produce in strip 24 a net or resultant field having a direction from left to right. Furthermore, it can be seen that the magnetic field 72 now produces a net or resultant field in the first magnetic strip 20 having a direction from right to left. These resultant magnetic fields in the first and second magnetic strips 20 and 24 in cooperation with the word magnetic field produced by the current $I_W$, indicated in FIG. 4 of the drawing, are used to provide a residual or stored flux in the second magnetic strip 24 having a direction from left to right indicated by the arrow at 76 and in the first magnetic strip 20 having an opposite direction, i.e., from right to left, indicated by the arrow at 78, in FIG. 7 of the drawing, which illustrates the condition of the storage system after the drive current pulses have been terminated. It can be readily understood that the residual or stored flux in magnetic strips 20 and 24 is reversed in direction when the direction of current through the conductive lines 16 and 22 is reversed.

It should also be understood that a given magnitude of magnetic field intensity may be provide in each of the magnetic strips 20 and 24 by adjusting the amount of current through both or one of the conductive lines 16 and 22 and by adjusting the distance between the ground plane and the conductive lines 16 and 22. Furthermore, it should be understood that the conductive lines 16 and 22 are preferably flat, thin transmission lines which are closely spaced.

In a more specific example of the invention, each of the conductive lines 16 and 22 and each of the magnetic strips 20 and 24 may be 4 mils wide and 0.25 mil thick with the distance between the upper surface of the ground plane or substrate 12 and the lower surface of the lower magnetic strip 20 being 0.75 mil. Assuming an air medium, or its equivalent, surrounding the conductive lines 16 and 22, an ampere of current passing through the two conductive lines 16 and 22 produces at their outer surfaces a magnetic field of 62.5 oersteds. Since it is known that the magnetic field decreases with an increase in distance from the surface of the 4 mil width conductor, the strength of the magnetic field at a point about 2 mils from the conductor may be calculated or measured to be one half that of the field at the surface, i.e., the field is 31.25 oersteds, about 2 mils from the conductor. Thus, the magnetic field in the second magnetic strip 24 as a result of one ampere of current flow through the conductive lines 16 and 22 is equal to 62.5 oersteds with a direction from left to right and the magnetic field in the second magnetic strip 24 as a result of one ampere of the image current flow through the portions 16' and 22' is equal to 31.25 oersteds, since the second strip 24 is approximately 2 mils from the portion 16' and 22', with a direction from right to left. The resultant field in the second strip 24 is, therefore, 31.25 oersteds from left to right. Since the first magnetic strip 20 is also substantially 2 mils from the portions 16' and 22', a field of 31.25 oersteds passes through the second strip from right to left. With equal magnetic field intensities in each of the strips 20 and 24 of the coupled film 10, wide disturb margins are available in both the first and second magnetic strips 20 and 24 when the coupled film 10 is used in a memory array as illustrated in FIG. 8 of the drawing.

Figure 8:
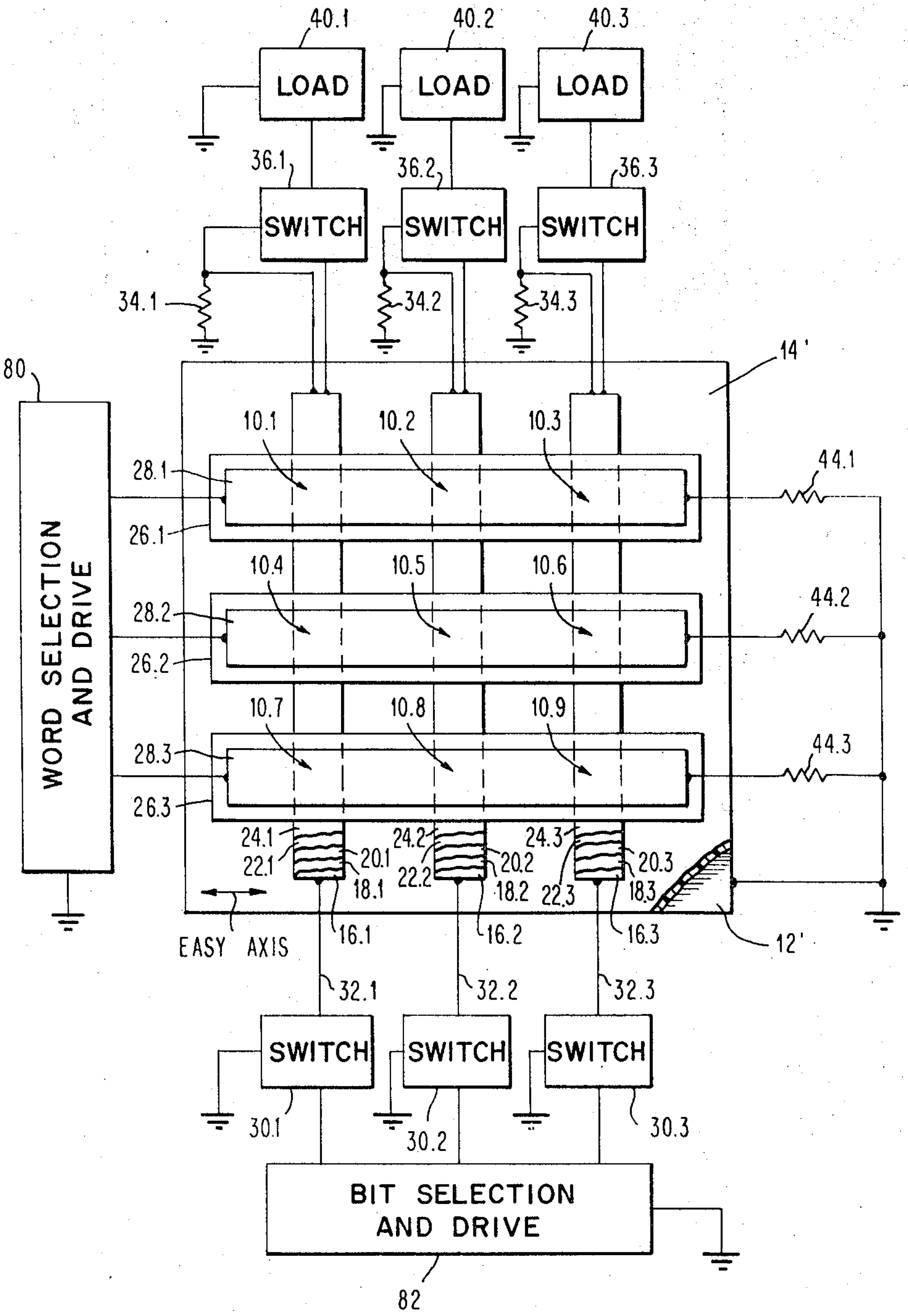
FIG. 8 shows a magnetic film storage system of the present invention which includes a planar array having a plurality of storage elements.

In FIG. 8 of the drawing there is illustrated an embodiment of the present invention which includes a planar array of a plurality of coupled films 10.1 to 10.9. The system is word organized having a plurality of horizontal word lines 28.1, 28.2 and 28.3 disposed on first insulation strips 26.1, 26.2 and 26.3, respectively, and a plurality of vertical bit lines which are formed by pairs of conductive lines 16.1 and 22.1, 16.2 and 22.2, and 16.3 and 22.3. The conductive lines 22.1, 22.2 and 22.3 are interposed between first magnetic film strips 20.1, 20.2 and 20.3 and second magnetic strips 24.1, 24.2 and 24.3, respectively, and the conductive lines 16.1, 16.2 and 16.3 are interposed between second insulation strips 18.1, 18.2 and 18.3 and insulation layer 14', which is disposed on a conductive substrate 12', in a manner similar to that described hereinabove in connection with the description of the system illustrated in FIGS. 1, 2 and 3 to form the coupled films 10.1 to 10.9.

The word lines 28.1, 28.2 and 28.3 are each connected at one end to a word selection and drive means 80 and at the other end to ground through word line terminating impedances 44.1, 44.2 and 44.3, respectively. The word selection and drive means 80 provides address selection of a particular word line 28.1, 28.2 or 28.3 and pulse generation corresponding to the word line driver 42 of the system of FIGS. 1, 2 and 3. The bit lines 16.1 and 22.1, 16.2 and 22.2, and 16.3 and 22.3 which are arranged in a magnetically coupled relationship with coupled films 10.1, 10.4 and 10.7, 10.2, 10.5 and 10.8, and 10.3, 10.6 and 10.9, respectively, are connected at one end to bit selection and drive means 82 through a respective switch 30.1, 30.2 and 30.3 via conductors 32.1, 32.2 and 32.3. The opposite end of the conductive lines 22.1, 22.2 and 22.3 are connected by respective switches 36.1, 36.2 and 36.3 either to loads 40.1, 40.2 and 40.3 or to bit line terminating impedances 34.1, 34.2 and 34.3. The opposite end of the conductive lines 16.1, 16.2 and 16.3 are directly connected to the line terminating impedances 34.1, 34.2 and 34.3. The means 82 provides the function of bit addressing and pulse generation corresponding to the bit line driver 38 of the system of FIGS. 1, 2 and 3 while each switch 30.1, 30.2 and 30.3 corresponds to the switch 30 and each switch 36.1, 36.2 and 36.3 corresponds to the switch 36 of FIG. 1.

In the operation of the system illustrated in FIG. 8 of the drawing when "1" and "0" bits of information are to be written into the coupled films of a word line, for example, into films 10.4, 10.5 and 10.6 of the word line 28.2, the word selection and drive means 80 is operated to pass a current corresponding to the current indicated at 46 of FIG. 4 at (*a*) of the drawing through the word line 28.2 and the bit selection and drive means 82 is operated to pass through the bit lines 16.1 and 22.1, 16.2 and 22.2, and 16.3 and 22.3 current 48 and 50 which may be related in time to the current 46 in the word line 28.2 as indicated in FIG. 4 of the drawing and having polarities corresponding to the bit or digital information to be stored in the coupled films 10.4, 10.5 and 10.6, in the manner described hereinabove in connection with the writing of "1" and "0" bits of information in the system of FIGS. 1, 2 and 3.

When information stored in the coupled films 10.4, 10.5 and 10.6 is to be read out, the word selection and drive means 80 is operated to pass a current through the word line 28.2 to orient the magnetization in the coupled films 10.4, 10.5 and 10.6 in the hard direction. When a destructive read operation is desired, a current having a magnitude sufficient to orient the magnetization completely in the hard direction is passed through the word line 28.2. When a non-destructive read operation is desired, a current having a magnitude less than that which would completely magnetize both the top and bottom magnetic layers of the coupled films 10.4, 10.5 and 10.6 in the hard direction is passed through the word line 28.2. The output signals indicative of the stored information in the coupled films 10.4, 10.5 and 10.6 of the word line 28.2 are bipolar as stated hereinabove in connection with the description of FIG. 1 and are applied to their respective loads 40.1, 40.2 and 40.3, which may be conventional sense amplifiers, by the proper operation of the switches 30.1, 30.2, 30.3, 36.1, 36.2 and 36.3. Information is written into and read out of the coupled films 10.1, 10.2 and 10.3 and 10.7, 10.8 and 10.9 associated with the word lines 28.1 and 28.3, respectively, in a similar manner as described hereinabove with the handling of information in the word line 28.2 by the proper operation of the word and bit selection and drive means 80 and 82.

It can be seen in FIG. 8 of the drawing that an unselected bit or coupled film may be subjected to the full bit field and to a stray field from selected neighboring word lines. Under the influence of such repeated disturb fields reverse edge domains grow and at times finally eliminate the original stored information in conventional magnetic films. However, by equalizing the magnetic fields produced by the bit line current in the first and second magnetic strips of the coupled films, a minimum required field is produced in the lower or first magnetic strips which is no greater than the minimum required field provided for the upper or second magnetic strips of the coupled films. Since the bit field for writing information into a given location is the disturb field for all other locations along the bit line, wider disturb margins are obtained when the bit write field is minimized.

It should be understood that the teachings of the present invention are applicable to systems having two or three dimensional magnetic memory arrays and that the invention is not limited to any particular mode of operation, since, for example, storage may be performed by processes other than domain rotational processes described hereinabove. It should also be understood that bipolar or unipolar writing processes may be used in the invention. Furthermore, the magnetic material of the coupled films may be made of any desired material, although permalloy is preferred, and the material of the conductive strips may be, for example, silver, copper, aluminum or gold.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A storage system comprising:

(a) an electrically conductive substrate, (b) a first set of a first given plurality of parallel strips of magnetic material, (c) a set of said first given plurality of parallel strips of non-magnetic material, each of said non-magnetic strips being aligned with respect to a different one of said magnetic strips, (d) a second set of said given plurality of parallel strips of magnetic material disposed parallel to said first magnetic strip set, said non-magnetic strips being interposed between said first and second magnetic strip sets, said magnetic strips being disposed on one side of said substrate and said magnetic strips having an easy axis in the direction perpendicular to the length of said strips, and (e) means for applying to the magnetic strips of said first set and to the magnetic strips of said second set combinations of magnetic fields so related to one another that net magnetic fields of substantially the same intensity are applied respectively to the magnetic strips of said first and second sets for selectively orienting the magnetization in said magnetic strips at spaced apart sections along the length thereof.

2. A storage system comprising:

(a) an electrically conductive substrate, (b) first and second sets each of a given plurality of parallel strips of magnetic material having a given easy axis disposed on the same side of said substrate, (c) third and fourth sets each of said given plurality of electrically conductive strips, the strips of each set being arranged in a separate plane and the strips of said sets being aligned in stacked parallel relationships with said third set being interposed between said first and second sets, and (d) means including said third and fourth sets for applying to the magnetic strips of said first set and to the magnetic strips of said second set combinations of magnetic fields so related to one another that net magnetic fields of substantially the same intensity are applied respectively to the magnetic strips of said first and second sets for selectively orienting the magnetization in said magnetic strips at spaced apart sections along the lengths thereof.

3. A storage system as set forth in claim 2 wherein:

(a) said means includes means for producing a first magnetic field in the direction of said easy axis and a second magnetic field perpendicular to said easy axis, and (b) further including additional magnetic strips arranged in a cooperative relationship with the magnetic strips of said first and second sets to provide closed magnetic paths around each of the conductive strips of said third set.

4. A storage system comprising:

(a) an electrically conductive substrate, (b) a coupled film including a pair of magnetic layers disposed on one side of said substrate, and (c) means for applying to each of said magnetic layers a plurality of magnetic fields having different polarities and intensities so related to one another that net magnetic fields of substantially the same intensity and opposite polarities are applied respectively to the magnetic layers of said film for controlling the magnetization therein, said means including:

(d) a first electrically conductive strip disposed between the layers of said coupled film, and (e) a second electrically conductive strip disposed between said coupled film and said substrate.

5. A storage system as set forth in claim 4 wherein said coupled film is arranged to completely surround said first electrically conductive strip.

6. A storage system as set forth in claim 4 wherein said coupled film includes magnetic strips contacting said magnetic layers to completely surround said first electrically conductive strip.

7. A storage system as set forth in claim 4 wherein said means further includes means for applying current pulses to said first and second conductive strips and means for producing a magnetic field in said layer perpendicular to the magnetic field produced by the current in said first and second conductive strips.

8. A storage system as set forth in claim 4 wherein said first and second conductive strips are arranged in a parallel relationship with respect to each other.

9. A storage system as set forth in claim 4 further including an insulating layer disposed between said first and second conductive strips.

References Cited

UNITED STATES PATENTS

| | | | |
|---|---|---|---|
| 3,375,503 | 3/1968 | Bertelsen | 340—174 |
| 3,461,438 | 9/1969 | Chang et al. | 340—174 |

BERNARD KONICK, Primary Examiner

S. B. POKOTILOW, Assistant Examiner